Sept. 7, 1943.  J. M. CHRISTMAN  2,328,783
METHOD OF AND MACHINE FOR FINISHING GEAR TEETH
Filed April 24, 1940
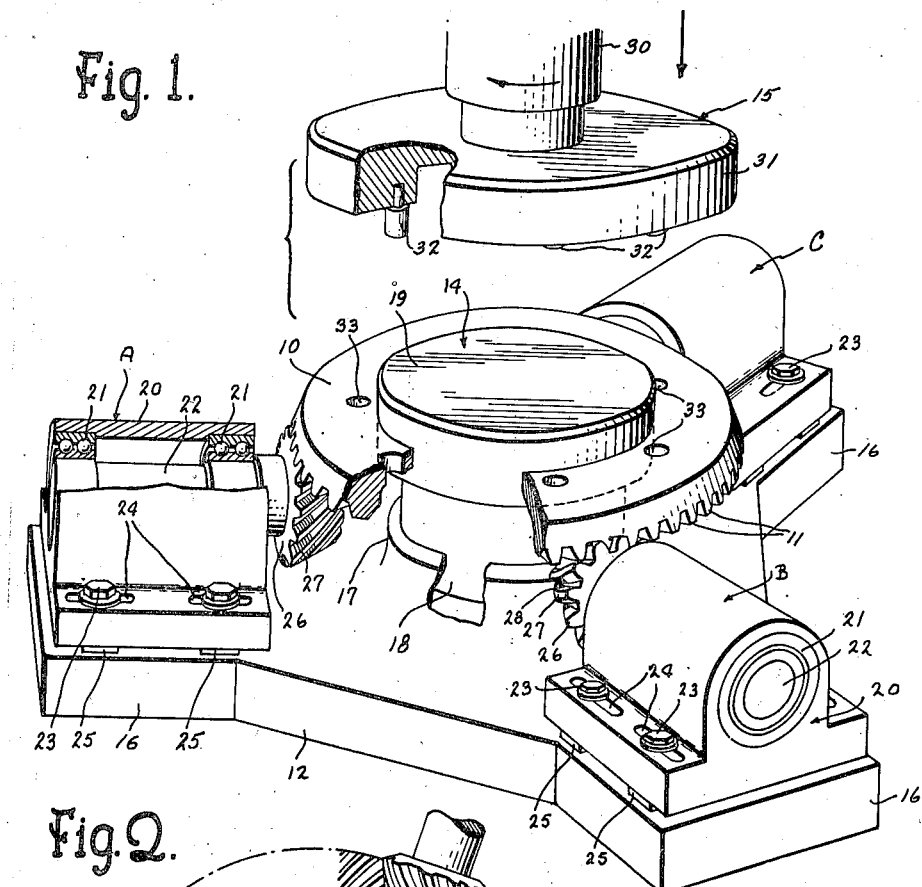
Fig. 1.
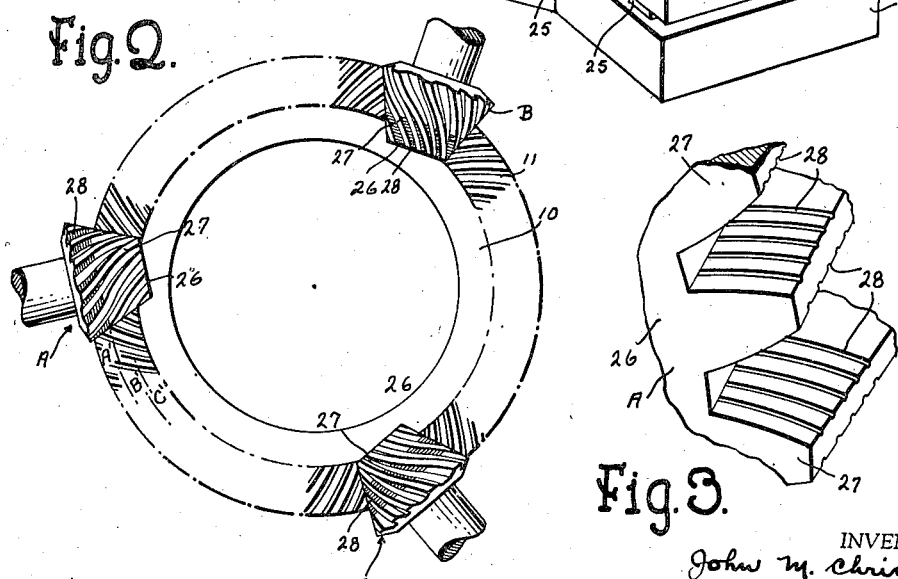
Fig. 2.
Fig. 3.
INVENTOR.
John M. Christman
BY
Tibbetts & Hart
ATTORNEYS

UNITED STATES PATENT OFFICE 2,328,783

METHOD OF AND MACHINE FOR FINISHING GEAR TEETH

John M. Christman, Detroit, Mich., assignor to Packard Motor Car Company, Detroit, Mich., a corporation of Michigan Application April 24, 1940, Serial No. 331,409

7 Claims. (Cl. 90—1.6)

This invention relates to a method of and apparatus for finishing helical gears.

The teeth of helical gears if generated by cutters to bear along their entire faces when driving in meshed relation will be sprung by pressure so that only the end portions of the faces contact, and as a consequence noisy operation results. In order to overcome this condition it is customary to provide cutters that will generate a bearing zone intermediate the ends of the faces of the gear teeth so that there will be no contact at the ends of the gear teeth when operating in mated relation under load.

The generating operation generally leaves the teeth of hypoid ring gears rough, and inaccurate as to pitch cone angle, tooth depth and radial angular position. The hardening operation usually further distorts the teeth so that the final finishing operation, usually lapping of the mating gears, must remove considerable material to true up the gear teeth in order to insure quiet operation.

It is an object of this invention to finish helical gears to close limits between the generating and hardening operations by a shaving and burnishing process to reduce the lapping operation required.

Another object of the invention is to provide an improved method for quickly and accurately finishing hypoid gears, after a tooth generating operation forming the faces of the teeth with bearing zones intermediate their ends, in which the bearing zone and the adjacent end zones of the faces of the teeth are shaved and burnished substantially individually.

A further object of the invention is to provide apparatus for shaving and burnishing spiral gear teeth to close limits.

Still another object of the invention is to provide apparatus having a plurality of shaving and burnishing cutters that will operate in different zones lineally of the teeth of a spiral gear to materially reduce the error that is present after a tooth generating operation forming the bearing zones intermediate the ends of the faces of the teeth.

Still another object of the invention resides in apparatus for accurately shaving and burnishing spiral gears by means of which an equalized pressure is provided to produce a similar cutting action on the teeth even though their depth may vary.

Other objects of the invention will appear from the following description taken in connection with the drawing, which forms a part of this specification, and in which:

Fig. 1 is a perspective view of an apparatus operative in accordance with the invention for shaving and burnishing a hypoid ring gear;

Fig. 2 is a view looking upwardly at the ring gear and the shaving and burnishing devices and illustrating the arrangement of the devices with respect to the ring gear;

Fig. 3 is a fragmentary perspective view of one of the shaving and burnishing devices.

This invention applies to gears having helical or spiral teeth and is illustrated in connection with a hypoid ring gear 10, of the type usually employed as the driving element of a motor vehicle axle structure. The teeth 11 of such hypoid gear are usually first generated by a suitable cutter and then hardened, after which error in the teeth, resulting from inaccuracies of the generating operation and distortion resulting from the hardening process, is removed to some extent by a final lapping operation. The generating operation can be such that the central zone of the faces of the teeth form the contact or bearing areas when meshing with a mated pinion gear. Ordinarily after the tooth generating operation and the pitch cone angle, the tooth depth and radial angular position may vary to some extent. The hardening operation tends to further increase these inaccurate tooth conditions so that considerable material must be removed during the finishing lapping operation. The lapping operation is slow and increases manufacturing cost unduly when these extensive tooth corrections are encountered. In order to reduce the extent of the lapping operation, this invention proposes to shave and burnish the gear teeth to close limits, between the tooth generating and hardening operations.

Apparatus by means of which the invention can be carried out consists generally of a bed 12, cutter units A, B and C, pilot means 14 carried by the bed and work gear pressure and drive means 15. The bed is suitably fixed on a suitable stationary support (not shown) and has three wings 16 forming a mounting for the cutter units. A collar or flange 17 extends upwardly from the central portion of the bed and receives the rotatable stem 18 of a circular pilot head 19 that corresponds in diameter to the central opening through the hypoid ring gear.

The cutter units each include a housing 20 carrying bearings 21 through which shaft 22 extends. These housings are adjustably secured on the bed wings by suitable fastening means in the form of bolts 23 that extend through elongated slots 24 in the housings. These slots allow adjustment of the housings on the bed in the direction of the axis of the shaft carried thereby and the slots are wide enough to allow the housings to be bodily adjusted laterally a limited extent. The vertical position of the housings can be varied by suitable shims 25 placed between the housings and the bed.

The cutters 26 for shaving and burnishing the work gear are fixed to the inner ends of the shafts and they are in the form of gears having spiral teeth 27. Any number of cutting units can be employed but three are preferably used so that the hypoid gear when placed thereon in mesh with the cutter teeth will have a floating three-point mounting. The spiral teeth of the cutters are formed on their faces with radially extending grooves 28 and similar grooves in the teeth are staggered relatively lineally of the teeth so that the cutting edges formed thereby will not operate in the same path, thus avoiding the creation of ribs on the work gear teeth which otherwise would be formed.

The arrangement of the cutters is such that the shaving and burnishing portions of their teeth are effective upon different portions or zones of the work gear teeth in a lineal direction. This result can be accomplished either by the length of the cutters, or by formation of their teeth so that only a lineal portion thereof will function to shave and burnish. The zones on the work gear teeth operated upon by the cutters can be separated, they can overlap, or they can adjoin at their ends. In the drawing, I have illustrated cutters that will shave and burnish the entire length of the work gear tooth surfaces with some overlapping of the zones operated upon lineally. With the illustrated arrangement, as shown best in Fig. 2, the cutter A operates on the work gear tooth surfaces in the lineal zone A', the cutter B operates on the work gear tooth surfaces in the lineal zone B' and the cutter C operates on the work gear tooth surfaces in the zone C'.

In this method of simultaneously shaving and burnishing gear teeth, the hypoid ring gear is positioned on and in intermeshing relationship with the cutters with the pilot head 19 extending through the central opening thereof. The cutters are properly adjusted so that they will operate in their zones as required to finish the hypoid ring gear. Due to the fact that the ring gear has a three-point support on the cutters, it will float thereon and compensate for varying tooth conditions under vertical pressure when rotated so that the teeth will be finished uniformly.

The shaving and burnishing operation results from the application of the pressure and driving means to the work gear. A spindle 30 carrying a head 31 is arranged above the cutters and is suitably rotated and controlled for vertical movement. This head carries driving pins 32 projecting from its lower face that are arranged to register with and enter openings 33 formed in the ring gear. After positioning the ring gear in piloted intermeshing relationship with the cutters, the driving head 31 is lowered to drivingly couple with the ring gear, and thereafter the head is rotated while applying pressure thereagainst in an axial direction. Thus the ring gear is rotated while being pressed against the contacting shaving and burnishing portions of the teeth of the cutters that are in mesh with the work gear. Surplus metal will be removed from the three zones of the ring gear teeth so that the errors in each zone will be accurately corrected individually, except of course where the zones overlap. Thus each zone of the gear teeth can be substantially individually corrected.

With the method and apparatus herein described, helical gears can be quickly and more accurately finished than previously.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. The method of simultaneously shaving and burnishing helical gears which comprises positioning such a gear in an intermeshing relationship with spaced cutters of helical gear form having the cutting portions of their teeth engaging the gear in substantially different zones lineally of the teeth, and rotating the gear while applying pressure thereagainst in the direction of the cutters.

2. The method of simultaneously shaving and burnishing a hypoid ring gear which comprises positioning such a gear in intermeshing relationship with rotatable cutters of helical gear form arranged in equally spaced relationship circularly and so that the cutting portion of the teeth of each are in different stations radially of the hypoid gear teeth, and rotating the hypoid gear while pressing it against the cutters.

3. The method of simultaneously shaving and burnishing a hypoid ring gear which comprises positioning such a gear in piloted intermeshing relationship on rotatably mounted shaving and burnishing cutters of helical gear form with the cutting portions of the teeth of each cutter lying substantially in different zones lineally of the hypoid gear teeth, and rotating the hypoid gear while pressing it against the cutters.

4. A machine for finishing the teeth of a hypoid ring gear comprising a base, a pilot on the base for centering the ring gear, three equally spaced shaving and burnishing gear members on which the ring gear rests and meshes with, said members being formed to shave and burnish different zones lineally of the gear teeth bearing faces, means on said base rotatably supporting said gear members, and means for rotating said ring gear and applying pressure thereagainst.

5. A machine for finishing the teeth of a hypoid ring gear comprising a base, a pilot on the base adapted to be telescoped by the ring gear, gear members on which the ring gear can rest and mesh with, the teeth of said gear members being formed to shave and burnish different zones lineally of the faces of the ring gear teeth, means rotatably supporting the gear members on the base, said means being adjustable to shift said gear members in either an axial or radial direction, and a spindle for rotating said ring gear and pressing the same against the gear members.

6. A machine for finishing the teeth of a hypoid ring gear comprising three rotatably supported equally spaced gear members, supporting means for the gear members adjustable to shift the positions of the gear members axially or radially, means for centering the ring gear in meshing relation with the gear members, the gear members having effective tooth portions for shaving and burnishing the ring gear teeth located relatively different distances from the ring gear axis, and means for rotating and applying pressure axially against said ring gear while engaged with said gear members.

7. A machine for finishing the teeth of a hypoid ring gear comprising a base, a pilot rotatably mounted on the base for centering the ring gear, shaving and burnishing members rotatably mounted on the base, said members being equally spaced and adapted to mesh with and support said ring gear, and a spindle having driving lugs engageable with the ring gear for rotating and pressing the same against the members, said members being formed to shave and burnish different zones radially on the ring gear teeth.

JOHN M. CHRISTMAN.